April 17, 1962  J. C. MOBLEY  3,029,554
WILDLIFE CALLER
Filed July 22, 1960

INVENTOR
JOHN C. MOBLEY,
BY John Gibson Semmes
ATTORNEY

United States Patent Office 3,029,554
Patented Apr. 17, 1962

3,029,554
WILDLIFE CALLER
John C. Mobley, 618 Linden Ave., Portsmouth, Va.
Filed July 22, 1960, Ser. No. 44,809
10 Claims. (Cl. 46—177)

The present invention relates to a wildlife calling device, particularly a waterfowl caller embodying in its air chamber both a whistle and a reed for initiating a plurality of different calls.

Conventional wildlife callers of the type which may be carried on the hunter or nature observer's person have separately comprised either a whistle or a reed mounted within the air chamber. Some such callers have embodied a plurality of whistles or a plurality of reeds, together with means for changing the pitch of the whistle or limiting the vibrations of the reeds so as to initiate authentic wildlife calls.

A principal shortcoming of such devices, at least as applied to the calling of waterfowl, has been their incapability of initiating both whistle and reed calls. Thus, the caller is confronted with the problem of carrying both a whistle and a reed caller on his person.

The present caller eliminates the necessity for carrying two such callers, because it supports in its air chamber both a whistle call and a reed call component. These components are manipulable via the same air entry port. The reed section embodies a reed carrying support which fits within the discharge end of the air chamber and supports a reed longitudinally above a reed support shoulder. The whistle is mounted in the top of the air chamber and includes means for locking said reed to said support shoulder when the whistle is in open or whistle call position. Conversely, when the whistle is in closed or reed call position, the reed is unlocked and presented for call.

Accordingly, it is an object of invention to provide a wild life call which provides a plurality of different types of sound.

Another object of invention is to provide a wild life call embodying both whistle and reed call components.

Another object of invention is to provide in a whistle embodying a plurality of different types of calling devices, means for locking such devices while others of such devices are in use.

Yet additional objects of invention will become apparent from the ensuing specification and attached drawings wherein.

Figure 1:
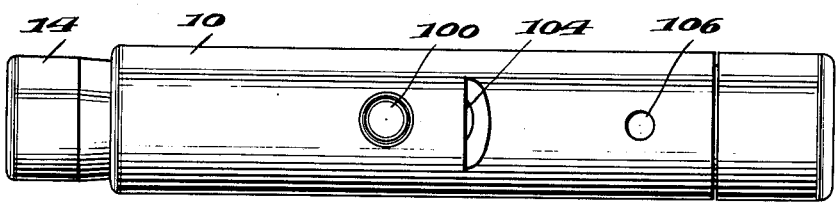
FIG. 1 is a top plan view of the wildlife caller, showing a tapered mouthpiece insertable in the air entry end.
Figure 3:
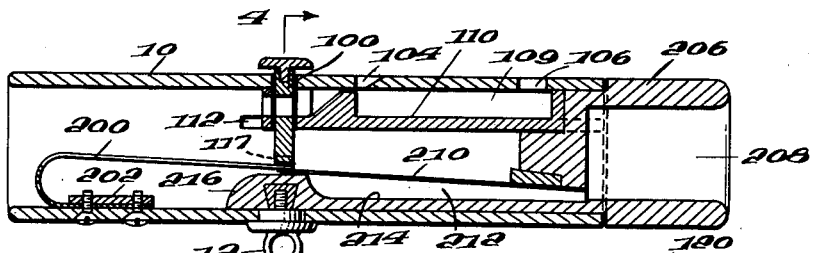

FIG. 3 is a longitudinal section of the device shown in FIG. 1 with mouthpiece removed, said whistle valve 100 being in open or whistle call position and locking reed 210 against reed support shoulder 216.

Figure 4:
Figure 5:
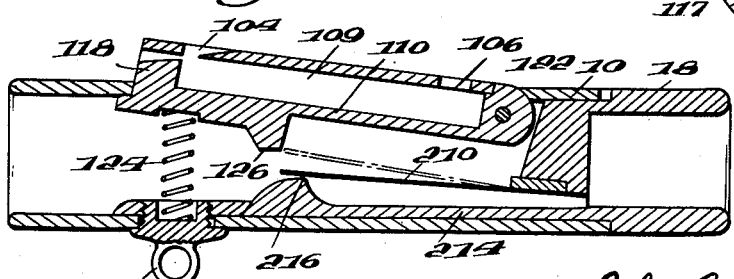

FIG. 4 is a transverse section, taken along section line 4—4 of FIG. 3 and showing whistle valve 100 in open position abutting superposed flat spring 200 and reed 210;

FIG. 5 is a modified device showing the whistle in closed or reed call position and pivoted above the top of the caller body so as to reelase reed 210 for actuation by air.

Figure 2:
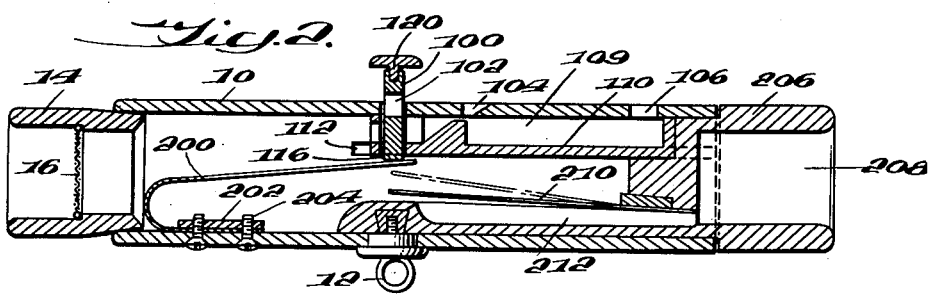
FIG. 2 is a longitudinal section of the wildlife caller, the whistle valve 100 being in closed or reed call position so as to release reed 210 for oscillatory actuation by air.

In FIG. 1 a wildlife caller is indicated as comprising body 10 into which is inserted tapered mouthpiece 14. As illustrated in FIG. 2, body 10 may have shoulder carrying ring 12 attached by screw means or the like. In the modification shown in FIG. 5 the shoulder carrying ring 12 is itself threaded for engagement with body 10. Mouthpiece 14 may have transverse screen 16 interiorly mounted so as to prevent fouling of whistle and reed components by foreign matter.

As indicated in FIGS. 2 and 3, the wildlife caller whistle component embodies whistle chamber piece 110 which is conformed complementally to the top interior of body 10. As shown in FIG. 4, whistle chamber piece 110 is mounted therein by means of its shoulders 114 engaging grooves 112. At the air entry end of whistle chamber piece 110 whistle valve 100 embodying medial air channel 102 is mounted. Threaded whistle cap 120 may be attached to the top of whistle valve 100 to facilitate vertical actuation of said valve.

As illustrated in FIGS. 2 and 3, the wildlife caller reed component comprises reed support piece 206 embodying air discharge exit 208 and fittable within body 10. Reed 210 is mounted upon reed support piece 206 so as to extend longitudinally within body 10 above elongated arm 214 and reed support shoulder 216 defined by reed support piece 206 extensions. A flat compression spring 200 may be mounted within body 10 by means of plate 202 and screws 204 or the like. The unfastened end of flat spring 200 engages whistle valve bottom 116 so as to urge whistle valve 100 upwardly to closed or reed call position, as illustrated in FIG. 2. Whistle valve bottom shoulders 117 abut the bottom of whistle chamber piece 110 in this closed or reed call position, thus setting air channel 102 out of alignment with air chamber 109 and limiting movement of whistle valve 100, so as to prevent its detachment from body 10. In this closed position air canot enter the whistle via channel 102 and reed 210 is released from support shoulder 216 for actuation by air, as indicated in phantom in FIG. 2.

As will be noted in FIG. 2, whistle end 116 when whistle 100 is in open or whistle call position abuts flat spring 200 which is superposed with reed 210 thus locking the reed against oscillation. Simultaneously, in whistle call position air channel 102 is aligned with the air chamber 109 defined by the piece 110.

When the whistle is in operation air may be discharged through transverse slot 104 in body 10 top. The pitch of the whistle may be varied by opening and closing pitch change aperture 106, so as to lengthen and shorten respectively whistle air chamber 109. In the modification illustrated in FIG. 5 whistle 118 is pivotable as at 122 through the top of body 10 so as to remove its stud portion 126 from reed support shoulder 216. Also, according to this modification, coil spring 124 may be utilized to urge whistle 104 to closed or reed call position, thus enabling unlocking and utilization of reed 210 for calling.

Suggested utilization of the present device as as waterfowl caller follows:

| Name Of Waterfowl | Characteristic Call | Remarks |
|---|---|---|
| Mallard duck | Quack | Use reed call. |
| Black duck | ----do---- | Do. |
| Gadwall duck | ----do---- | Do. |
| European widgeon | Whistle | Use whistle. |
| Baldpate duck | Whistle (low) | Use whistle low tone. |
| Pintail duck | Low whistle, also low purring sound | Use either or both whistle and reed alternately. |
| Green wing teal | Low quack | Use reed call. |
| Blue wing teal | Soft peeing notes, faint quack | Use high tone of whistle also reed. |
| Shoveler duck | Low feeble quack | Use reed call. |
| Wood duck | High pitch oo-eek | Use both whistle tones to simulate. |

As will be appreciated the present caller provides two separate and distinct types of sound which may be used sequentially for calling various species of wildlife. Manifestly, a plurality of whistles and reeds may be combined within a single caller, various other means may be provided for locking the reed, means may be provided for simultaneous utilization of whistle and reed and various changes and modifications may be made in the structure without departing from the spirit and scope of invention, as defined in the subjoined claims.

I claim:

1. In a caller of the type having a body defining an air chamber with an air entry port and an air discharge exit, the combination of a reed supported by said body within said air chamber and a whistle pivoted in said body opposite said reed, said whistle being pivotable into said air chamber and against said reed so as to urge said reed against said body in whistle open position and said whistle being pivotable away from said reed to a position out of communication with said air chamber to whistle closed position during calling through said reed.

2. A wildlife caller comprising a body, including an air chamber with air entry port and air discharge exit; a longitudinally disposed reed supported in said air chamber; and a vertically movable whistle supported in said air chamber above said reed, said whistle lockingly engaging said reed against said body in whistle open position and being retractable from said reed to a position out of communication with said air chamber in whistle closed position during call through said reed.

3. A wildlife caller as in claim 2, including spring means urging said whistle away from said reed to whistle closed position.

4. A wildlife caller comprising a body, including an air chamber with an air entry port and discharge exit, a reed supported interiorly and engaging the discharge exit of said air chamber and including a reed support shoulder presented inwardly of said chamber, a reed mounted in said support and extending longitudinally within said air chamber and above said support shoulder, a whistle valve vertically movable within the air entry end of said caller and supported above said reed support shoulder, said whistle valve engaging said reed against said support shoulder in whistle open position and being movable away from said reed and exteriorly of said air chamber in whistle closed position.

5. A waterfowl caller as in claim 4, including spring means mounted in said air chamber and urging said whistle valve to closed position.

6. A waterfowl caller as in claim 4, including a mouthpiece with an interiorly supported screen, connected to said air entry port.

7. A waterfowl caller as in claim 4, said whistle further comprising a longitudinally extending base complementally conformed to the top of said caller body and defining a whistle air chamber beneath a whistle air discharge exit in said top.

8. A waterfowl caller as in claim 7, including a pitch change aperture in said top of said caller body.

9. A waterfowl caller comprising a body, including an air chamber with air entry port and discharge exit, a reed support engaging the discharge end of said air chamber and including a reed support shoulder presented inwardly of said chamber, a reed mounted in said support and extending longitudinally within said air chamber and above said support shoulder, a whistle pivotably supported in said body above said reed support and being pivotable into and out of communication with said air entry port, and including a stud complementary to said reed support shoulder, said whistle when pivoted into communication with said air entry port in whistle open position engaging said reed against said support shoulder and when pivoted out of communication with said air entry port to whistle closed position releasing said reed for actuation by air.

10. A waterfowl caller as in claim 9 including spring means supported in said air chamber and urging said whistle to closed position.

References Cited in the file of this patent
UNITED STATES PATENTS

| | | |
|---|---|---|
| 726,277 | Fuller | Apr. 28, 1903 |
| 1,465,675 | McIntyre | Aug. 21, 1923 |